(12) United States Patent
Didenko et al.

(10) Patent No.: US 7,160,489 B2
(45) Date of Patent: Jan. 9, 2007

(54) CONTROLLED CHEMICAL AEROSOL FLOW SYNTHESIS OF NANOMETER-SIZED PARTICLES AND OTHER NANOMETER-SIZED PRODUCTS

(75) Inventors: Yuri T. Didenko, Savoy, IL (US); Kenneth S. Suslick, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 473 days.

(21) Appl. No.: 10/683,948

(22) Filed: Oct. 10, 2003

(65) Prior Publication Data

US 2006/0244164 A1    Nov. 2, 2006

(51) Int. Cl.
B29B 9/00 (2006.01)
(52) U.S. Cl. .................. 264/14; 264/5; 425/6
(58) Field of Classification Search ............... None
See application file for complete search history.

(56) References Cited

U.S. PATENT DOCUMENTS

| | | | |
|---|---|---|---|
| 5,665,277 A * | 9/1997 | Johnson et al. ............. | 264/6 |
| 5,958,361 A * | 9/1999 | Laine et al. ............... | 423/610 |
| 2003/0054218 A1 * | 3/2003 | Hampden-Smith et al. ... | 429/27 |
| 2003/0106488 A1 * | 6/2003 | Huang et al. .............. | 117/68 |
| 2004/0146560 A1 * | 7/2004 | Whiteford et al. .......... | 424/484 |
| 2004/0178530 A1 * | 9/2004 | Yadav ..................... | 264/5 |
| 2005/0109269 A1 * | 5/2005 | Alivisatos et al. ......... | 117/68 |
| 2005/0200036 A1 * | 9/2005 | Mosso et al. .............. | 264/14 |

OTHER PUBLICATIONS

Okuyama, Kikuo et al., "Preparation of ZnS and CdS Fine Particles Sizes by a Spray Pyrolysis Method", Journal of Materials Science, 1997, pp. 1229-1237, vol. 32, Chapman & Hall.

Peng, Xiaogang et al., "Shape Control of CdSe Nanocrystals", Nature, Mar. 2, 2000, pp. 59-61, vol. 404, Macmillian Magazines, Ltd.

Okuyama, Kikuo et al., "Preparation of nanoparticles via spray route", Chemical Engineering Science, 2003, pp. 537-547, vol. 58, Elsevier Science Ltd.

Murray, C.B. et al., "Synthesis and Characterization of Nearly Monodisperse CdE (E=S, Se, Te) Semiconductor Nanocrystallites", Journal of the American Chemical Society, 1993, pp. 8706-8715, vol. 115, No. 19, American Chemical Society, USA.

Peng, Z. Adam et al., "Nearly Monodisperse and Shape-Controlled CdSe Nanocrystals via Alternative Routes: Nucleation and Growth", Journal of the American Chemical Society, 2002, pp. 3343-3353, vol. 124, No. 13, American Chemical Society, USA.

Peng, Z. Adam et al., "Formation of High-Quality CdTe, CdSe, and CdS Nanocrystals Using CdO as Precursor", Journal of the American Chemical Society, 2001, pp. 183-184, vol. 123, American Chemical Society, USA.

Manna, Liberato et al., "Synthesis of Soluble and Processable Rod-, Arrow-, Teardrop-, and Tetrapod-Shaped CdSe Nanocrystals", Journal of the American Chemical Society, 2000, pp. 12700-12706, vol. 122, No. 51, American Chemical Society, USA.

Mdleleni, M. M.; Hyeon, T.; Suslick, K. S. Sonochemical synthesis of nanostructured molybdenum sulfide. *J. Am. Chem. Soc.* 120, 6189-6190, (1998).

(Continued)

*Primary Examiner*—Mary Lynn Theisen
(74) *Attorney, Agent, or Firm*—Banner & Witcoff, Ltd.

(57) ABSTRACT

A method and apparatus for producing nanometer-sized particles, the method including the steps of forming of mixture by mixing a first precursor reactant, a second precursor reactant, a surface-stabilizing surfactant, and a high boiling point liquid to form a mixture, forming a mist of droplets of the mixture, heating the droplets to cause a reaction between species of the first and second precursor reactants within the heated droplets, and collecting the nanometer-sized products.

46 Claims, 7 Drawing Sheets
(1 of 7 Drawing Sheet(s) Filed in Color)

OTHER PUBLICATIONS

Alivisatos, A. P. Perspectives on the physical chemistry of semiconductor nanocrystals. *J. Phys. Chem.* 100, 13226-13239 (1996).

Eychmuller, A. Structure and photophysics of semiconductor nanocrystals. *J. Phys. Chem. B* 104, 6514-6528 (2000).

Murray, C. B., Kagan, C. R.; Bawendi, M. G. Synthesis and characterization of monodisperse nanocrystals and close-packed nanocrystals assemblies. *Ann. Rev. Mater. Sci.* 30, 545-610 (2000).

Green, M., O'Brien, P. O. Recent advances in the preparation of semiconductors as isolated nanometric particles: new routes to quantum dots. *Chem. Comm.* 11, 2235-2241 (1999).

T. Trindadae, P. O'Brien, N. L. Pickett. Nanocrystalline semiconductors: synthesis, properties and perspectives. *Chem. Mater.* 13, 3843-3858 (2001).

Grieve, K.; Mulvaney, P.; Grieser, F. Synthesis and electronic properties of semiconductor nanoparticles/quantum dots. *Current Opinion Coll. Interface Sci.* 5, 168-172 (2000).

Colvin, V. L.; Schlamp, M. C.; Alivisatos, A. P. Light-emitting diodes made from cadmium selenide nanocrystals and a semiconducting polymer. *Nature* 370, 354-357 (1994).

Bruchez, M., Jr. et al. Semiconductor nanocrystals as fluorescent biolgical labels. *Science* 281, 2013-2016 (1998).

Chan, W. C. W.; Nie, S. Quantum dot bioconjugates for ultrasensitive nonisotopic detection. *Science* 281, 2016-2018 (1998).

Huynh, W. U.; Dittmer, J. J.; Alivisatos, A. P. Hybrid nanorods-polymer solar cells. *Science* 295, 2425-2427 (2002).

Huynh, W. U. et al. Controlling the morphology of nanocrystals-polymer composites for solar cells. *Adv. Funct. Mater.* 13, 73-79 (2003).

Klimov, V. I., et al. Optical gain and stimulated emission in nanocrystals quantum dots. *Science* 290, 314-317 (2000).

Eisler, H-J. et al. Color-selective semiconductor nanocrystals laser. *Appl. Phys. Lett.* 80, 4614-4616 (2002).

Thurston, T. R.; Wilcoxon, J. P. Photooxidation of organic chemicals catalysed by nanoscale $MoS_2$. *J. Phys. Chem. B.* 103, 11-17 (1999).

Murray, C. B.; Norris, D. J.; Bawendi, M. G. Synthesis and characterization of nearly monodisperse CdE (E=S, Se, Te) semiconductor nanocrystallites. *J. Am. Chem. Soc.* 105, 88706-88715 (1993).

Gratzel, M. Photoelectrochemical cells. *Nature (London)*, 414, 338-344 (2001).

Larson, D. et al. Water-soluble quantum dots for multiphoton fluorescence imaging in vivo. *Science* 300, 1434-1436 (2003).

Striolo, A. et al. Molecular weight, osmotic second viral coefficient, and extinction coefficient of colloidal CdSe nanocrystals. *J. Phys. Chem. B*, 106, 5500-5505 (2002).

Qu, L.; Peng, X. Control of photoluminescence properties of CdSe nanocrystals in growth. *J. Am. Chem. Soc.* 124, 2049-2055 (2002).

American Chemical Society 34th Great Lakes Regional Meeting; Minneapolis, MN, Item No. 301, Tuesday, Jun. 4, 2002, Nolte Room at 9:20-9:45 a.m. Applications of Ultrasound to Materials Chemistry. Kenneth S. Suslick, Yuri T. Didenko, Abstract (1 page); Slides (10 pages).

* cited by examiner

FIGURE 1

Figure 2. Fluorescence of CdS colloids obtained by Ultrasonic Spray Pyrolysis.

Figure 3A. Absorbance emission spectra of CdSe/SA nanoparticles.

Figure 3B. Fluorescence emission spectra of CdSe/SA nanoparticles.

Figure 4A. XRD of CdSe/SA nanoparticles obtained by USP at 340°C.

Figure 4B. TEM of CdSe/SA nanoparticles obtained by USP at 340°C.

Figure 4C. Fluorescence of CdSe nanoparticles obtained by USP at various temperatures from 180°C to 320°C, left to right: colors of fluorescence are deep blue, light blue, green, yellow-green, yellow, orange, and red, respectively from left to right.

CONTROLLED CHEMICAL AEROSOL FLOW SYNTHESIS OF NANOMETER-SIZED PARTICLES AND OTHER NANOMETER-SIZED PRODUCTS

FEDERALLY SPONSORED RESEARCH OR DEVELOPMENT

This invention was made with Government support under Contract CHE-0079124 awarded by the National Science Foundation (NSF). The Government has certain rights in the invention.

CROSS-REFERENCES TO RELATED APPLICATIONS

None.

FIELD OF THE INVENTION

The present invention relates to nanometer-sized products, such as nanoparticles (also called nanocrystals or quantum dots), nanometer-sized rods, and branched nanocrystals (e.g., tripods and tetrapods), and more particularly, to methods for manufacture of nanometer-sized products and apparatus for such manufacture.

BACKGROUND OF THE INVENTION

Nanoparticles (i.e., particles having 1–20 nm diameter) have been the subject of intense research during the last decade due to their novel electronic, catalytic, and optical properties. As an example, it has been reported that nanostructured molybdenum sulfide ($MoS_2$) is a good catalyst for hydrogensulfurization (HDS). One method for making nanostructured $MoS_2$ is using sonochemical synthesis. See M. M. Mdleleni, T. Hyeon, K. S. Suslick (1998). "Sonochemical Synthesis of Nanostructured $MoS_2$" *J. Am. Chem. Soc.* 120: 6189–6190. Cadmium selenide (CdSe) is the most studied material, arguably due to its tunable fluorescence in visible region, potential use in industrial and biomedical applications.

Variations in fundamental properties of nanoparticles can be induced simply by changing the size of the crystals while holding their chemical composition constant. Despite their high potential, very few applications for nanocrystals have been developed, in large part due to difficulty and cost associated with producing uniform nanosize particles in sufficient quantities for exploring new practical applications and processing techniques.

Semiconductor nanoparticles, containing hundreds to a few tens of thousands of atoms show strong size-dependence of their physico-chemical properties. See e.g., Alivisatos, A. P. (1996). "Perspectives on the physical chemistry of semiconductor nanocrystals." *J. Phys. Chem.* 100(31): 13226–13239; Eychmuller, A. (2000). "Structure and photophysics of semiconductor nanocrystals." *J. Phys. Chem. B* 104(28): 6514–6528; C. B. Murray, C. R. Kagan, M. G. Bawendi (2000). "Synthesis and characterization of monodisperse nanocrystals and close-packed nanocrystal assemblies." *Ann. Rev. Mater. Sci.* 30: 545–610; M. Green, P. O'Brien (1999). "Recent advances in the preparation of semiconductors as isolated nanometric particles: new routes to quantum dots." *Chem. Commun.:* 2235–2241; T. Trindadae, P. O'Brien, N. L. Pickett (2001). "Nanocrystalline semiconductors: synthesis, properties and perspectives." *Chem. Mater.* 13: 3843–3858; K. Grieve, P. Mulvaney, F. Grieser (2000). "Synthesis and electronic properties of semiconductor nanoparticles/quantum dots." *Current Opinion Coll. Interface Sci.* 5: 168–172. One particularly evident example of such quantum size effects is the blueshift of absorbance and fluorescence emission with decreasing size of semiconductor nanoparticles. Potential applications of semiconductor nanoparticles include light emitting diodes (see V. L. Colvin, M. C. Schlamp, A. P. Alivisatos (1994). "Light-emitting diodes made from cadmium selenide nanocrystals and a semiconductor polymer." *Nature* (*London*) 370: 354–357), biological fluorescent labels (see M. Bruchez Jr., M. Moronne, P. Gin, S. Weiss, A. P. Alivisatos (1998). "Semiconductor nanocrystals as fluorescent biological labels." *Science* (*Washington D.C.*) 281: 2013–2016; and W. C. W. Chan, S. Nie (1998). "Quantum dots bioconjugates for ultrasensitive nonisotopic detection." *Science* (*Washington D.C.*) 281: 2016–2018), solar cells (see W. U. Huynh, J. J. Dittmer, A. P. Alivisatos (2002). "Hybrid Nanorod-Polymer Solar Cells." *Science* (*Washington D.C.*) 295: 2425–2427; and W. U. Huynh, J. J. Dittmer, W. C. Libby, G. L. Whiting, A. P. Alivisatos (2003). "Controlling the morphology of nanocrystal-polymer composites for solar cells." *Adv. Funct. Mater.* 13: 73–79), lasers (see V. I. Klimov, A. A. Mikhilovsky, S. Xu, A. Malko, J. A. Hollingsworth, D. W. McBranch, C. A. Leatherdale, H-J. Eisler, M. G. Bawendi (2000). "Optical gain and stimulated emission in nanocrystal quantum dots." *Science* (*Washington D.C.*) 290: 314–317; and H-J. Eisler, V. C. Sundar, M. G. Bawendi, M. Walsh, H. I. Smith, V. I. Klimov (2002). "Color-selective semiconductor nanocrystal laser." *Appl. Phys. Lett.* 80: 4614–4616), and catalysts (see T. R Thurston, J. P. Wicoxon (1999). "Phooxidation of organic chemicals catalyzed by nanoscale $MoS_2$." *J. Phys. Chem. B.* 103: 11–17).

Various techniques have been used for the synthesis of semiconductor nanocyrstals, for example: arrested precipitation in solutions, synthesis in structured media, high temperature pyrolysis, sonochemical, and radiolytic methods. See, Alivisatos, A. P. (1996). "Perspectives on the physical chemistry of semiconductor nanocrystals." *J. Phys. Chem.* 100(31): 13226–13239; Eychmuller, A. (2000). "Structure and photophysics of semiconductor nanocrystals." *J. Phys. Chem. B* 104(28): 6514–6528; C. B. Murray, C. R. Kagan, M. G. Bawendi (2000). "Synthesis and characterization of monodisperse nanocrystals and close-packed nanocrystal assemblies." *Ann. Rev. Mater. Sci.* 30: 545–610; M. Green, P. O'Brien (1999). "Recent advances in the preparation of semiconductors as isolated nanometric particles: new routes to quantum dots." *Chem. Commun.:* 2235–2241; T. Trindadae, P. O'Brien, N. L. Pickett (2001). "Nanocrystalline semiconductors: synthesis, properties and perspectives." *Chem. Mater.* 13: 3843–3858; K. Grieve, P. Mulvaney, F. Grieser (2000). "Synthesis and electronic properties of semiconductor nanoparticles/quantum dots." *Current Opinion Coll. Interface Sci.* 5: 168–172. However, each of these approaches have significant limitations, the most important one being difficulty of scale-up.

Bawendi et al. in 1993 described a method (hereinafter "the Bawendi method") for the production of chalcogenide nanoparticles. See C. B. Murray, D. J. Norris, M. G. Bawendi (1993). "Synthesis and characterization of nearly monodisperse CdE (E=S, Se, Te) semiconductor nanocrystallites." *J. Am. Chem. Soc.* 115: 88706–8715. The Bawendi method involves high temperature decomposition of organometallic reagents in hot, coordinating solvents. In accordance with the Bawendi method, solutions of dimethylcadmium ($Cd(CH_3)_2$) and tri-n-octylphosphineselenide (TOPSe) are injected into hot tri-n-octylphosphineoxide (TOPO) at temperatures from ~120 to 300° C. The size distribution of particles can be controlled mainly by the temperature of reaction mixture and the length of the reaction time, with larger particles obtained at higher temperature and longer time of reaction.

The Bawendi method is most popular among conventional methods as it allows for the production near monodisperse particles with good luminescent properties. However, one of the limitations of the Bawendi method is the use of hazardous compounds like $Cd(CH_3)_2$ especially at high temperatures. It should be recognized that reagents used in the Bawendi method are relatively expensive. For example, around year 2003, 100 ml of tri-n-octylphosphine technical grade (TOPO), 90% purity, from Aldrich Chemical Co., Milwaukee, Wis., costs about $72.50. Around year 2003, the price for 25 g of dimethylcadmium (Strem Chemicals, Inc. of Newburyport, Mass.) was $540.00. Another disadvantage is that the Bawendi method is complicated, not easily reproducible, and difficult to scale up. Peng et. al. have shown recently that the Bawendi method can be modified by changing precursors and the solvents in which the reaction occurs. See L. Qu, Z. A. Peng, X. Peng (2001). "Alternative routes toward high quality CdSe nanocrystals." *Nano Letters* 1: 333–337; and Z. A. Peng, X. Peng (2001). "Formation of high-quality CdTe, CdSe, and CdS nanocrystals using CdO as precursor." *J. Am. Chem. Soc.* 123: 183–184. Cadmium oxide, carbonate or acetate have been used in place of dimethylcadmium. Non-coordinating solvents (dodecene) instead of TOPO can be used with some success. See W. W. Yu, X. Peng (2002). "Formation of high-quality CdS and other II-VI semiconductor nanocrystals in noncoordinating solvents: tunable reactivity of monomers." *Angew. Chem. Int. Ed.* 41: 2368–2371. Using different solvents and surfactants, Peng et al. were able to synthesize nanoparticles of different size and morphology. See Z. A. Peng, X. Peng (2001). "Formation of high-quality CdTe, CdSe, and CdS nanocrystals using CdO as precursor." *J. Am. Chem. Soc.* 123: 183–184; and Z. A. Peng, X. Peng (2002). "Nearly monodisperse and shape-controlled CdSe nanocrystals via alternative routes: nucleation and growth." *J. Am. Chem. Soc.* 124: 3343–3353.

Nonetheless, the use of expensive solvents in high temperature reaction mixtures into which aggressive chemicals must be very quickly and reproducibly injected makes such procedures difficult to scale up. In addition, in order to produce nanoparticles of a desired size, the reaction must be stopped by rapid cooling. All of these problems restrict the use of conventional methods on a larger scale necessary for industrial application. The development of new synthetic methods that are able to produce well-defined materials of nanometer size (especially in a continuous flow process) remains a serious challenge.

SUMMARY OF THE INVENTION

This present invention provides new, scalable, and inexpensive methods for producing nanometer-sized products of controllable shapes and sizes. In particular, the present invention provides new methods of ultrasonic spray pyrolysis (USP) for continuous chemical aerosol flow synthesis (CAFS) resulting in the controlled production of nanometer-sized products, such as nanoparticles. The present invention can be used to synthesize a wide range of products, including but not limited to, nanoparticles (e.g., semiconductor nanoparticles), nanostructured (i.e., made of nanometer-sized components) catalysts, nanometer-sized rods, and tripods and tetrapods (i.e., structures made from a plurality of nanometer-sized products). The present invention can be used to obtain high quality fluorescent nanoparticles (e.g., of CdS, CdSe, and CdTe), nanostructured molybdenum sulfide, nanostructured metals, metal and metalloid oxides, and other catalysts and nanomaterials of desired shapes and sizes. Precursors for the manufacture of such products in accordance with the present invention include cadmium precursors, molybdenum precursors, and chalcogenide (e.g., sulfur, selenium, and tellurium) precursors.

In accordance with the present invention, chemical reactions occur inside tiny liquid droplets, containing reactants and a surface stabilizer or surfactant. The surfactants act to stabilize the nanoparticles being formed.

This method has many advantages over conventional methods, including: (1) the synthesis proceeds in isolated nanoscale reactors (i.e., liquid droplets) carried in a gas phase at controllable (high) temperatures; (2) the reaction zone is separated from the initial solution, which is kept at lower (or room or even cryogenic) temperatures; (3) nanometer-sized products can be obtained in any desired quantity with high quality and reproducibility once the parameters of the procedure are established; and (4) the obtained nanometer-sized products can be easily deposited on desired surfaces or collected at low temperatures in desired solvent. The method of the present invention is less expensive than conventional methods, is scalable, and allows for the synthesis of high quality nanometer-sized products from both water and organic solvents.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

As described below, using the ultrasonic spray pyrolysis (USP) techniques of the present invention, the synthesis of cadmium sulfide nanocolloids from water solutions and cadmium selenide and cadmium telluride from organic solvents was achieved. The methods of the present invention allow for the continuous and controlled generation of nanometer-sized products of desired size, shape and composition. Using the present invention, continuous and controlled synthesis of diverse nanomaterials with adjustable sizes and properties can be achieved. For example, the present invention can also be used to synthesize nanostructured molybdenum sulfide, which is good catalyst for petroleum hydrodesulfurization (HDS).

In accordance with the methods of the present invention, particle sizes can be obtained in the desired 1 to 20 nm region. There are several approaches to solving the problem of continuous and controlled synthesis of nanoparticles in the 1 to 20 nm region.

1. Concentration approach. The diameter of a particle ($D_p$) produced by USP can be given by the following expression:

$$D_p = (MD_d^3 C_s/1000 \rho)^{1/3}$$

where $C_s$ is concentration of the solution in mole/L, M is molecular weight, $\rho$ is the density of the particle, and $D_d$ is the mean diameter of the aerosol droplets used in the USP method. Okuyama et al. obtained ZnS and CdS particles with mean volume diameter ~0.6 µm by irradiating 0.1 M water solutions of $Cd(NO_3)_2$ and thiourea at 1.75 MHz. K. Okuyama, I. W. Lenggoro, N. Tagami, S. Tamaki and N. Tohge (1997). "Preparation of ZnS and CdS fine particles with different particle sizes by a spray pyrolysis method." *J. Mater. Sci.* 32: 1229–1237. Decreasing the precursor concentration by 4–5 orders of magnitude (~$10^{-5}$–$10^{-6}$ M) should therefore yield particles in 13–30 nm range. This approach, however, inherently decreases rates of production also by 4 to 5 orders of magnitude and is therefore of limited value.

2. Acoustical approach. Little attention has been paid to the physical acoustics relevant to USP. The frequency (f) at which the precursor solution is irradiated determines the size of the aerosol droplet formed, and thus the size of the particle formed:

$$D_d \sim (\pi \sigma / \rho f^2)^{1/3}$$

For example, the average mean diameter of water droplets is ~4.6 μm at 1.75 MHz ultrasound frequency. K. Okuyama, I. W. Lenggoro, N. Tagami, S. Tamaki and N. Tohge (1997). "Preparation of ZnS and CdS fine particles with different particle sizes by a spray pyrolysis method." *J. Mater. Sci.* 32: 1229–1237. Increasing the frequency of ultrasound to ~5 MHz would yield a droplet size of ~2.2 μm; the resulting semiconductor particle would be similarly smaller.

Other variables such as furnace temperature, velocity of gas flow through the reactor, chemical composition of solution, can be used to influence particle size and uniformity and to reduce the extent of particle agglomeration.

3. Surface Tension Control. It has now been discovered that there is another way to make nanometer-sized products using ultrasound spray pyrolysis. Importantly, the surface tension of the solution can also be varied to generate smaller aerosol droplets. It has now been discovered that the addition of surfactants (or the use of surfactant precurors) is especially useful.

FIG. 1 illustrates an apparatus for chemical aerosol flow synthesis in accordance with a preferred embodiment of the present invention. As shown in FIG. 1, the ultrasonic nebulizer 10 creates droplets 12 of water solution, which are carried to furnace 14 by a gas 16 (which can be an inert gas or a chemically active gas). For example, an ultrasonic nebulizer 10 at 1.7 MHz at ~5 W/cm$^2$ atomizes a solution into droplets 12. An example of a suitable nebulizer is Sunbeam-Oster model 696 household ultrasonic humidifier. The droplets are carried to furnace 14 by an argon stream having a flow rate of 1.5 L/min. In a preferred embodiment, the heated droplets each have a volume of about 1×$10^{-20}$ L to 1×$10^{-10}$ L. In a more preferred embodiment, the heated droplets each have a volume of about a femtoliter (~1×$10^{-15}$ L). Particles are collected using a vessel 18, such as a bubbler, filled with a cold liquid (such as water or other suitable liquid), solid powder, or solid surface, to cool the heated droplets from furnace 14.

At the high temperatures within the tube 20, water evaporates from the droplets 12 and chemical reactions leading to the formation of quantum dots (also called q-dots) start taking place. FIG. 1 shows a first precursor reactant source 22, a second precursor reactant source 24, a surface-stabilizing surfactant source 26, and a high boiling point liquid source 28. If the initial solution contains a surfactant(s), the initially formed composition will consist of nanoparticles surrounded by other chemicals present in the mixture. Colloidal nanoparticles can be formed after dissolution of this mixture in water. As described below, in one example, nanocolloids of cadmium sulfide were obtained.

EXAMPLES

Preliminary results show that the surfactant USP approach of the present invention works well and in fact desired nanoparticles can be formed in an aerosol flow. Experiments to test this approach have been successful and high quality, different size CdS, CdSe, and CdTe quantum dots were synthesized from aqueous and organic solutions, respectively.

Using a similar approach, both nanostructured and nanosized $MoS_2$ can be synthesized from water and organic solutions. As a precursor for water solution synthesis, the single source precursor $(NH_4)_2MoS_4$ (see P. Afanasiev, C. Geantet, C. Thomazeau, B. Jouget (2000). "Molybdemum polysulfide hollow microtubules grown at room temperature from solution." *Chem. Comm.* 1001–1002) can be used.

1. Synthesis of CdS from aqueous solutions. Experimental setup for the synthesis of nanocolloids is shown in FIG. 1. A solution containing $10^{-2}$ M of a soluble cadmium salt (e.g., $Cd(NO_3)_2$, $Cd(CH_3CO_2)_2$, etc.), 2×$10^{-2}$ M of a thermally decomposable source of sulfide (e.g., thiourea, thioacetamide, etc.), and $10^{-1}$ M to $10^{-2}$ M of surfactant (e.g., sodium citrate, polyphosphate, thioglycerol, mercaptoacetic acid, cysteine, etc.) was dissolved in water and sonicated using a nebulizer working at 1.75 MHz. The mist was carried to the furnace by argon gas and heat treated at temperatures between 200 and 900° C.

As the droplets are heated in the gas stream, solvent evaporates from the surface of the droplet and thiourea decomposes giving hydrogen sulfide, which reacts with the cadmium ions giving CdS. The presence of sodium citrate, polyphosphate or other molecules (e.g., thioglycerol, mercaptoacetic acid, cysteine, etc.) in the mixture prevents CdS particles from agglomerating. This mixture gives colloids of nanometer size after dissolution in water. Obtained nanocolloids are fluorescent (see FIG. 2) and give emission at different wavelengths, depending on the nature of the surfactant. Notably, fluorescence intensity of such colloids can be significantly enhanced by the addition of cadmium ions to the solutions.

While CdS nanocrystals were obtained in the above example, they were not uniform in shape and size. As discussed below, it has now been discovered that the quality of obtained nanocolloids can be further improved by finding optimum conditions for nanoparticles formation, by size selective precipitation and surface modification.

2. USP synthesis of CdSe from organic solutions. Synthesis of other chalcogenides from water and organic solutions can be achieved in accordance with the present invention. One of the first targets was the synthesis of cadmium selenide nanoparticles. The advantage of CdSe nanoparticles over other nanometer size fluorophores is that its fluorescence covers the whole visible region, so it potentially can be used as a visible-light photocatalyst or as a multiwavelength fluorescent probe. See M. Gratzel (2001). "Photoelectrochemical cells." *Nature (London)* 414: 338–344; and D. Larson et al (2003). "Water-soluble quantum dots for multiphoton fluorescence imaging in vivo" *Science (Washington D.C.)* 300: 1434–1436.

The USP synthesis of cadmium selenide was performed from both water and organic solutions. A number of surfactants and precursors were tested for the production of high quality nanocrystals. The method described above can be modified by using water, mixture of water with other solvents, and by changing precursors. The surface of the obtained CdSe nanocrystals can be passivated with ZnS or CdS and analyzed using TEM, XRD and absorbance/fluorescence spectroscopy.

Figure 1:
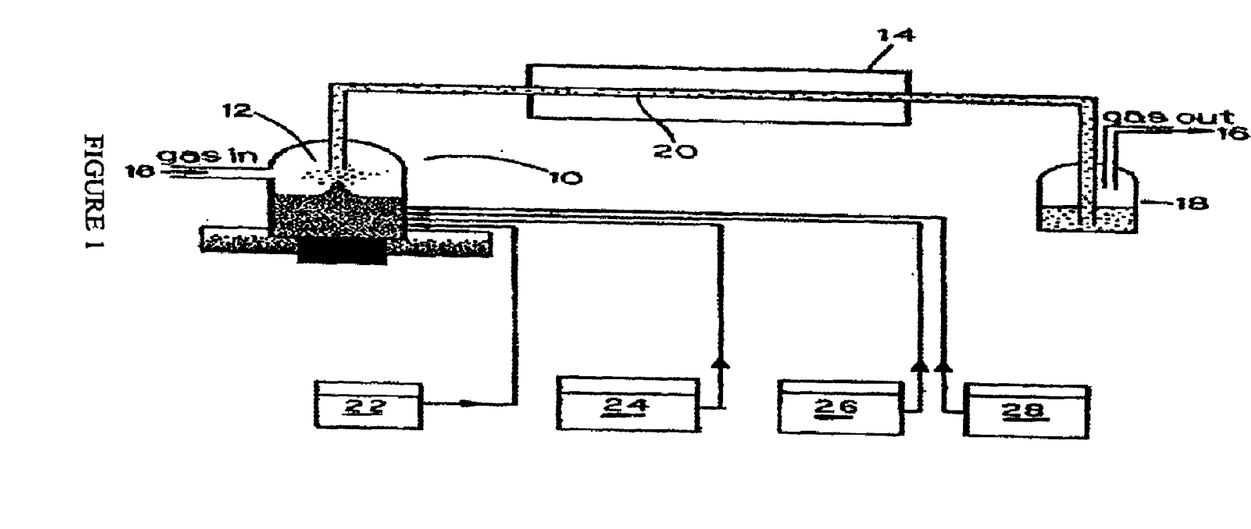
FIG. 1 illustrates an apparatus for chemical aerosol flow synthesis in accordance with a preferred embodiment of the present invention.
Figure 2:
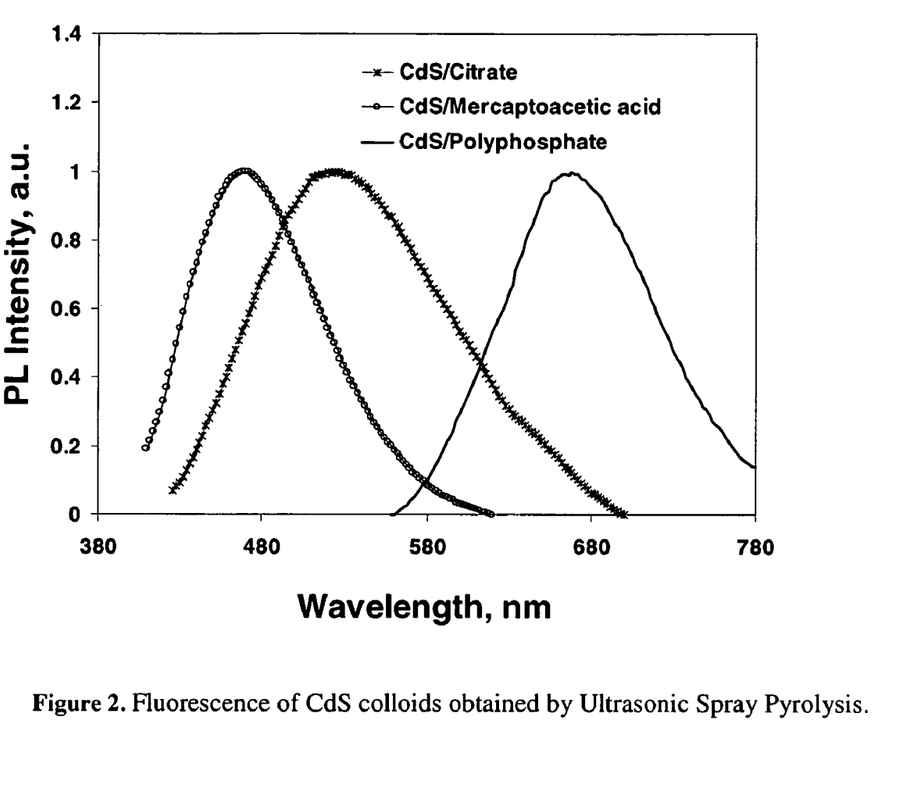
FIG. 2 illustrates the fluorescence of CdS colloids obtained using ultrasonic spray pyrolysis.

The synthesis of CdSe nanoparticles from organic solutions initially used a mixture of trioctyphosphine/trioctylphosphine oxide with cadmium and selenium precursors, which were atomized using an ultrasonic nebulizer and passed through a furnace tube using the apparatus shown in FIG. 1. The reaction of cadmium and selenium precursors was allowed to proceed in small droplets of solvent. By adjusting the temperature of the furnace and the residence time of the droplets in the tube it was possible to get nanocrystals with narrow size distribution and good quality. The initial mixture of reagents were dissolved in low viscosity, low boiling point solvents. This significantly decreased the cost of production and made the atomization process easier.

The procedure for the synthesis is as follows. The mixture of cadmium and selenium precursors is dissolved in a high boiling point solvent (e.g., trioctylphosphine, trioctylphosphine oxide, trioctylphosphine oxide with dioctylamine, stearic acid, hexadecylamine, oleic acid, dodecylamine, etc.), containing a surfactant that also serves as a surface stabilizer (e.g., capable of ligation to the particle surface). Examples of suitable stabilizers include TOPO, trioctylphosphine, stearic acid, hexadecylamine, oleic acid, dodecylamine, etc. The initial mixture of reagents is then diluted in low boiling point liquid (e.g., toluene, isodurene, or other suitable solvent) to make the nebulization process easier. An aerosol is created using an ultrasonic nebulizer working at 1.7 MHz ultrasound frequency. A dense mist is produced and carried by an Ar gas stream to pass through the tube furnace, whose temperature was controlled in the range from 100 to 400° C. As the temperature of the furnace is higher than the boiling point of toluene, the toluene evaporates first leaving the droplet with a concentrated solution of a high boiling point liquid with the mixture of reagents. At high enough temperatures, the mixture inside this high boiling point liquid droplet starts reacting and forms surfactant-coated nanometer-sized products. More specifically, the species (such as molecular or ionic species) of the first precursor reactant (cadmium) and second precursor reactant (selenium) react inside the high boiling point liquid and form surfactant-coated nanometer-sized products. These nanometer-sized products then exit the tube furnace and are collected in a bubbler containing a suitable solvent, such as toluene. The bubbler can be a standard bubbler made of glass, such as those produced by Chemglass Inc. (of Vineland, N.J.) and other companies.

The present invention overcomes the deficiencies in prior attempts to synthesize CdSe of nanometer size using spray pyrolysis or other decomposition methods. For example, the present invention overcomes the deficiencies in the methods described in K. Okuyama, I. W. Lenggoro, N. Tagami, S. Tamaki and N. Tohge (1997). "Preparation of ZnS and CdS fine particles with different particle sizes by a spray pyrolysis method." *J. Mater. Sci.* 32: 1229–1237, and K. Okuyama, W. Lenggoro (2003). "Preparation of nanoparticles via spray route," *Chem. Eng. Sci.* 58: 537–547. In these other studies, the decomposition of precursors occurs in the gas phase, and there is no phase separation or isolation of growing particles from the vapor. This makes it difficult to control size, size distribution, and shape of the resulting products. In contrast, in the present invention the nebulization of high boiling point liquids limits reactions to individual micron and nanometer sized droplets.

The present invention provides versatile and robust synthetic methodology. Different combinations of cadmium and selenium precursors, solvents and surface stabilizers can be used in accordance with the present invention. All of them can be used to obtain high quality fluorescent CdSe nanoparticles with different sizes.

For example, cadmium oxide, $Cd(NO_3)_2$, cadmium carbonate, cadmium naphthenate and cadmium acetate can be used as the Cd source. The source of selenium can be selected from the group consisting of phosphine chalcogenides or amine chalcogenides selected from the group consisting of triocytlphosphine selenide (e.g., a solution of elemental selenium dissolved in trioctylphosphine and/or ethylenediamine), tributylphosphine selenide, triethylphosphine selenide, and selenium ethylenediamine complexes. Trioctylphosphine/trioctylphosphine oxide (TOP/TOPO) with or without dioctylamine, stearic acid (SA) or hexadecylamine (HDA) can be used as high boiling point solvents. Different solvents have different boiling points, and each can be used to temperatures up to their respective boiling point. If the temperature of the furnace tube is higher than the boiling point of the solvent, the quality of nanoparticles decreases. Hexadecylamine, TOPO, SA and oleic acid (OLA) were also used as surface stabilizers of CdSe nanoparticles. Different stabilizers give different quality nanoparticles, and thus a different quantum yield of fluorescence. The reaction starts to proceed at different temperatures for different solvents and stabilizers.

CdSe nanoparticles obtained by USP from TOP/TOPO/SA/HDA at 300° C. were highly fluorescent (quantum yield (QY) ~25%, determined by comparison with the emission from rhodamine 6G) with narrow band emission, full width at half maximum (FWHM) ~30 nm. In accordance with the present invention, these numbers can be improved by changing chemical composition of the mixtures and increasing the residence time of reaction mixture inside the furnace tube.

In order to simplify the procedure, simpler mixtures can be used: for example, cadmium acetate and TOPSe in stearic acid. In one procedure in accordance with the present invention, 0.13 g of Cd acetate was added to melted stearic acid (1.43 g), heated to ~130° C. under argon flow to effect dissolution, and then cooled. A solution of 0.24 g of Se in 2 ml of TOP was then added. The mixture was diluted with 10 ml of toluene and misted using an ultrasonic nebulizer at 1.7 MHz at ~5 W/cm$^2$ (scavenged from a Sunbeam-Oster model 696 household ultrasonic humidifier). The mist was carried by an Ar flow (1 L/min) through a quartz tube in a furnace tube thermostated at the desired temperature. The quartz reaction tube was 40 cm long with a 2.9 cm diameter. Samples were collected in toluene. For XRD and TEM, samples were precipitated with methanol and then redissolved in chloroform, repeated at least four times to remove cosolvents and precursors. Absorbance spectra were collected using HP8452A UV-Vis spectrophometer. Fluorescence spectra were obtained with Fluoromax-2 spectrofluorimeter.

Figure 3A:
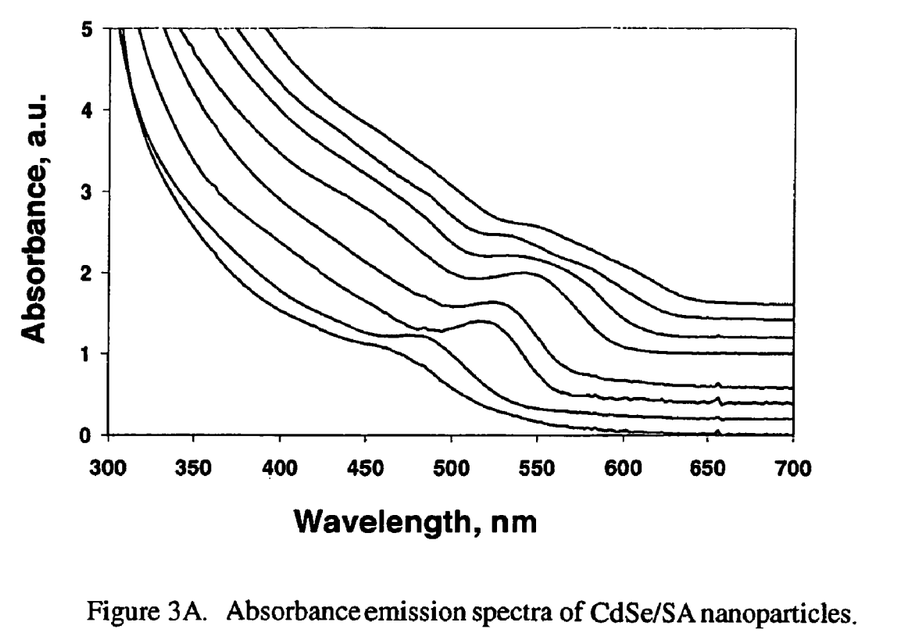
FIGS. 3A and 3B respectively illustrate absorbance and fluorescence emission spectra of CdSe/stearic acid nanoparticles obtained by USP at temperatures from 200 to 360 degrees Celsius from left to right.
Figure 3B:
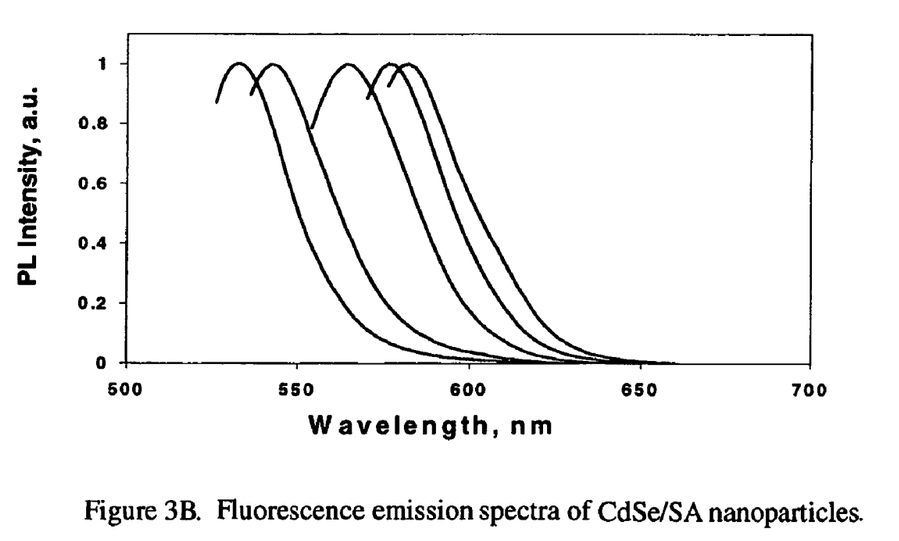

FIGS. 3A and 3B show absorbance and fluorescence spectra of nanoparticles so obtained. This mixture is rather versatile and allows for production of q-dots emitting over a broad spectral region by simply changing the temperature of the furnace tube. Similar results were obtained by replacing stearic acid (SA) with oleic acid (OLA) or hexadecylamine (HDA).

Figure 4A:
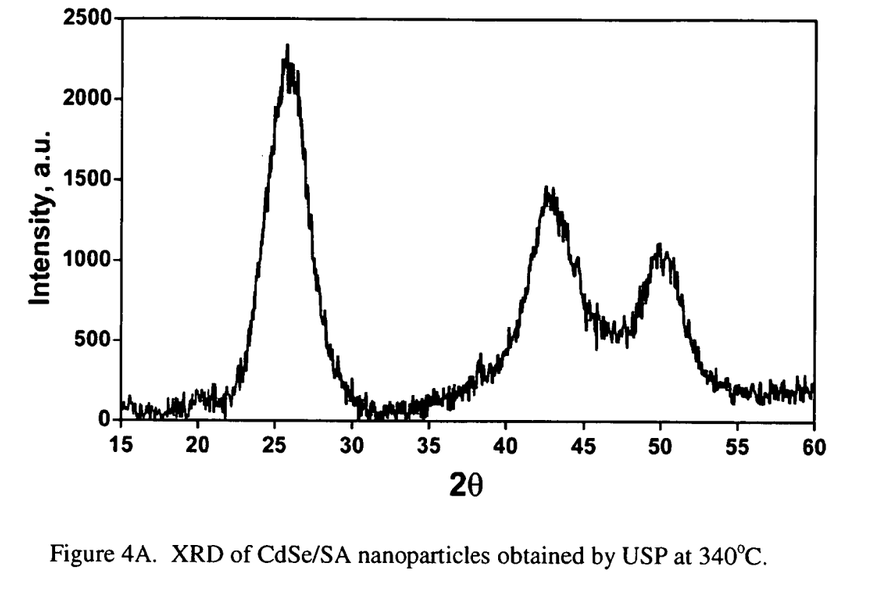
FIGS. 4A, 4B, and 4C respectively illustrate XRD, TEM, and Fluorescence of CdSe/stearic acid nanoparticles obtained by USP in accordance with the present invention.
Figure 4B:
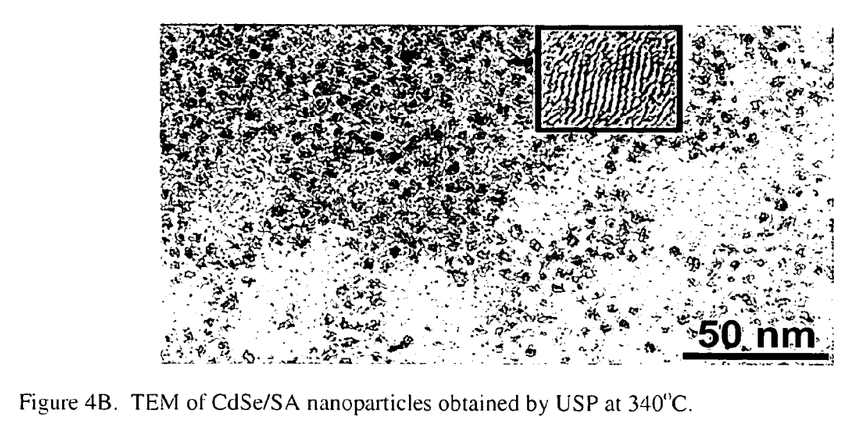
Figure 4C:
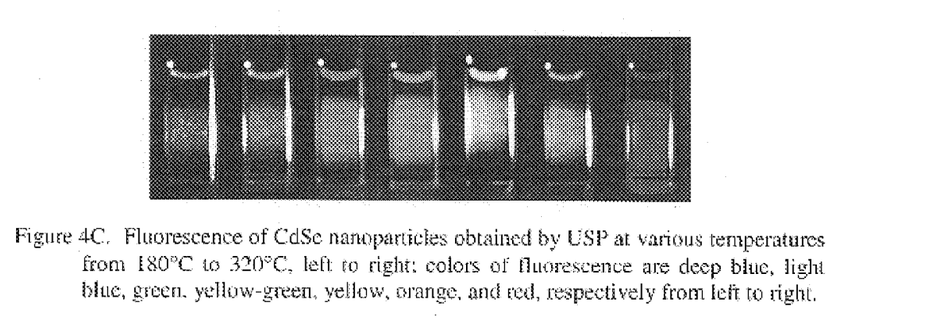

The size of obtained CdSe quantum dots can be estimated from literature data on the dependence of position of absorbance and fluorescence band vs size. See L. Qu, X. Peng (2001). "Control of photoluminescence properties of CdSe nanocrystals in growth." *J. Am. Chem. Soc.* 124: 2049–2055; and A. Striolo, J. Ward, J. M. Prausnitz, W. J. Parak, D. Zanchet, D. Gerion, D. Milliron, A. P. Alivisatos (2002). "Molecular Weight, osmotic second virial coefficient, and extinction coefficient of colloidal nanocrystals." *J. Phys. Chem. B* 106: 5500–5505. According to these data, the size of CdSe nanoparticles obtained in accordance with the present invention should lie in 2.4–3.4 nm region depending on the temperature of the furnace tube. This was confirmed by the TEM and XRD results shown in FIGS. 4A and 4B. Fluorescence results are shown in FIG. 4C. More specifically, FIG. 4C shows the fluorescence of CdSe nanoparticles obtained by USP at various temperatures from 180° to 320° C., left to right; the colors of fluorescence are deep blue, light blue, green, yellow-green, yellow, orange and red, respectively from left to right.

The method of the present invention is surprisingly applicable for the continuous production of substantially spherical nanoparticles from aerosol droplets. Quantum dots of different morphology can also find application in future technology. Nanorods made in accordance with the present invention, for example, can be used for manufacturing of solar cells and lasers. Those skilled in the art will recognize that the present invention can be used for the synthesis of nanoparticles of different morphology.

Figure 5:
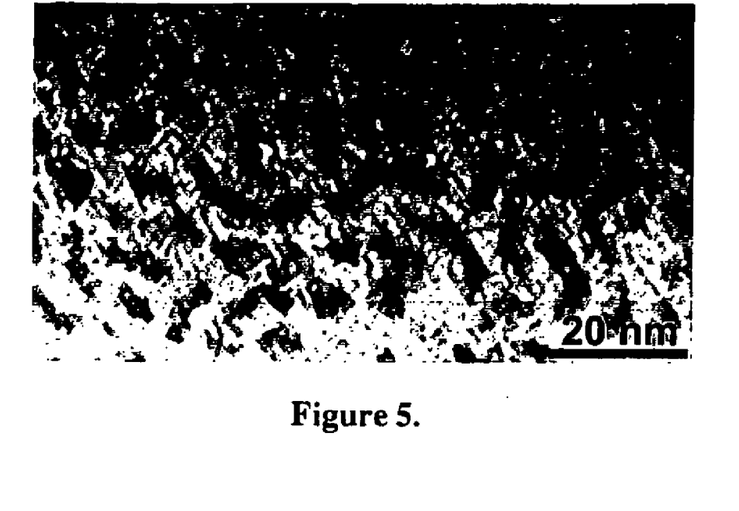
FIG. 5 illustrates CdSe nanorods obtained by USP in accordance with present invention using a mixture of cadmium acetate, TOPSe, oleic acid and dodecylamine at 240 degrees Celsius.

FIG. 5 shows a TEM of CdSe nanorods obtained from a two-times more concentrated solution of Cd acetate and TOPSe in a mixture of oleic acid and dodecylamine at 240° C. in accordance with the present invention. The rods were fluorescent with the FWHM ~30 nm and show quantization effect in absorbance. The diameter of rods was ~3 nm and the length ~9–10 nm.

Figure 6:
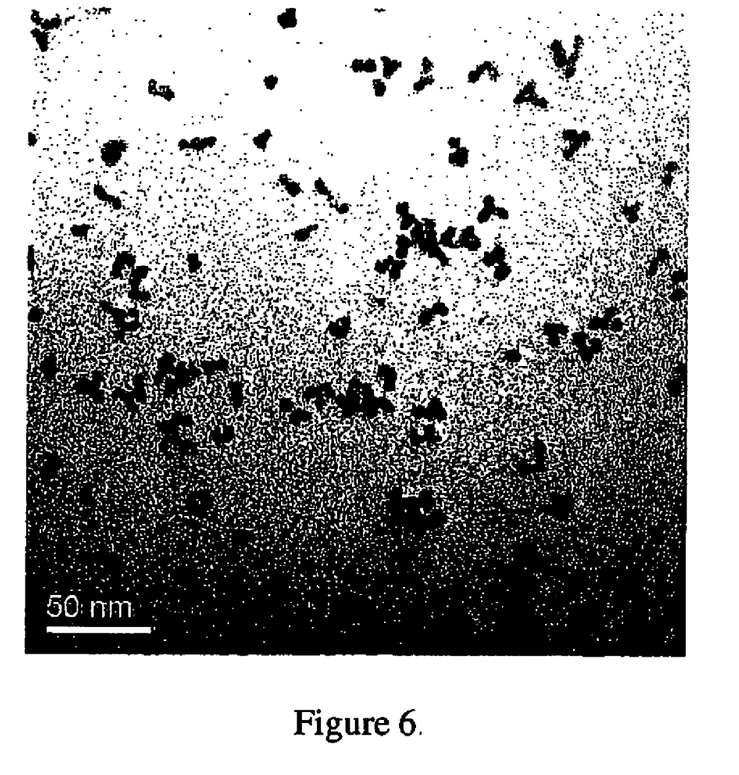
FIG. 6 illustrates TEM of CdTe nanoparticles of various morphologies.

The method for nanorods production can be further improved by using noncoordinating solvents (e.g., octadecene, see e.g. W. W. Yu, X. Peng (2002). "Formation of high-quality CdS and other II-VI semiconductor nanocrystals in noncoordinating solvents: tunable reactivity of monomers." *Angew. Chem. Int. Ed.* 41: 2368–2371), and alternative surface ligands (e.g., alkylphosphonic acides, ODPA, HDPA, or their mixtures, see e.g., Z. A. Peng, X. Peng (2002). "Nearly monodisperse and shape-controlled CdSe nanocrystals via alternative routes: nucleation and growth." *J. Am. Chem. Soc.* 124: 3343–3353; and L. Manna, E. C. Scher, A. P. Alivisatos (2000). "Synthesis of processable rod-, arrow-, teardrop-, and tetrapod-shaped CdSe nanocrystals." *J. Am. Chem. Soc.* 122: 12700–12706), and finding the best experimental conditions for the synthesis. Thus, a wide variety of nanometer-sized products can be formed in accordance with the present invention, including but not limited to tripods and tetrapod products, which themselves are formed from rods. FIG. 6 shows CdTe nanoparticles of various morphologies, including rods, tripods and tetrapods. These CdTe nanocrystals, obtained from the mixture of CdO, oleic acid, TOPTe, and isodurene at 280° C., show quantization effect in absorbance and are fluorescent.

In order to become applied widely both in the laboratory and ultimately industrially, nanomaterials must be made in high yield in environmentally friendly ways. The ultrasonic spray pyrolysis methods of the present invention can meet these needs as an inexpensive, scaleable method for the production of a variety of nanomaterials.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention.

We claim:

1. A method for producing nanometer-sized products comprising:
   mixing a first precursor reactant, a second precursor reactant, a surface-stabilizing surfactant, and a high boiling point liquid to form a mixture;
   forming a mist of droplets of the mixture;
   heating the droplets to cause a reaction between species of the first and second precursor reactants to form nanometer-sized products within the heated droplets; and
   collecting the nanometer-sized products.

2. The method of claim 1, wherein the step of heating the droplets is done in a furnace.

3. The method of claim 1, wherein the step of forming a mist of droplets of the mixture is performed in a nebulizer, ultrasonic nebulizer, or other mist generator.

4. The method of claim 1, wherein the step of forming the mist of droplets is performed by a first device, and the step of heating the droplets is performed by a second device.

5. The method of claim 4, wherein the first device is a nebulizer ultrasonic nebulizer, or other mist generator.

6. The method of claim 4, wherein the second device is a furnace.

7. The method of claim 4, including the step of carrying the mist of droplets from the first device to the second device using a carrier gas.

8. The method of claim 7, wherein the carrier gas is an inert gas.

9. The method of claim 7, wherein the carrier gas is a chemically active gas.

10. The method of claim 1, wherein the heated droplets each have a volume of about $1 \times 10^{-20}$ L to $1 \times 10^{-10}$ L.

11. The method of claim 10, wherein the heated droplets each have a volume of about $1 \times 10^{-15}$ L.

12. The method of claim 1, wherein the step of heating is carried out at 100° to 400° C.

13. The method of claim 1, wherein the first precursor reactant comprises a cadmium compound.

14. The method of claim 13, wherein the first precursor reactant is selected from the group consisting of CdO, $Cd(NO_3)_2$, $CdCO_3$, Cd naphthenate, and $Cd(CH_3CO_2)_2$.

15. The method of claim 1, wherein the second precursor reactant comprises a selenium compound.

16. The method of claim 15, wherein the second precursor reactant is selected from the group consisting of phosphine chalcogenides or amine chalcogenides, including those selected from the group consisting of trioctylphosphine selenide, tributylphosphine selenide, triethylphosphine selenide, and selenium ethylenediamine complexes.

17. The method of claim 15, wherein the second precursor reactant is selected from the group consisting of elemental selenium dissolved in trioctylphosphine and ethylenediamine.

18. The method of claim 1, wherein the surfactant is selected from the group consisting of trioctylphosphine, trioctylphosphine oxide, stearic acid, hexadecylamine, oleic acid, and dodecylamine.

19. The method of claim 1, wherein the high boiling point liquid selected from the group consisting of trioctylphosphine, trioctylphosphine with dioctylamine, trioctylphosphine oxide, trioctylphosphine oxide with dioctylamine, stearic acid, hexadecylamine, oleic acid, and dodecylamine.

20. The method of claim 1, wherein the step of collecting the nanometer-sized products comprises the step of cooling the heated droplets.

21. The method of claim 1, wherein the step of collecting the nanometer-sized products comprises the step of causing the heated droplets to come into contact with a cold liquid, solid powder, or solid surface.

22. The method of claim 20 wherein the heated droplets are cooled using a solvent-filled bubbler.

23. The method of claim 1 wherein the first precursor reactant is selected from the group consisting of cadmium precursors and molybdenum precursors, and the second precursor reactant is a chalcogenide precursor.

24. The method of claim 1 wherein the first precursor reactant comprises a cadmium precursor and the second precursor reactant comprises a chalcogenide precursor selected from the group consisting of sulfur, selenium, and tellurium precursors.

25. The method of claim 24 wherein the cadmium precursor is selected from the group consisting of cadmium oxide, cadmium carbonate, cadmium naphthenate, and cadmium acetate and the chalcogenide precursor is selected from the group consisting of elemental sulfur, selenium, tellurium dissolved in tributylphosphine or ethylenediamine and trioctylphosphine chalcogenide.

26. An apparatus for producing nanometer-sized products comprising:
a first precursor reactant source, a second precursor reactant source, a surface-stabilizing surfactant source, and a high boiling point liquid source to form a mixture;
a mist generator that forms a mist of droplets of the mixture;
a heating device to heat the droplets and to cause a reaction between species of the first and second precursor reactants within the heated droplets; and
a collecting device that collects the nanometer-sized products.

27. The apparatus of claim 26, wherein the heating device is a furnace.

28. The apparatus of claim 26, wherein the mist generator is a nebulizer or ultrasonic nebulizer.

29. The apparatus of claim 26, further including a carrier gas source, the carrier gas carrying the mist of droplets of the mixture from the mist generator to the heating device, and from the heating device to the cooling device.

30. The apparatus of claim 29, wherein the carrier gas is an inert gas.

31. The apparatus of claim 29, wherein the carrier gas is a chemically active gas.

32. The apparatus of claim 26, wherein the heated droplets each have a volume of about $1 \times 10^{-20}$ L to $1 \times 10^{-10}$ L.

33. The apparatus of claim 32, wherein the heated droplets each have a volume of about $1 \times 10^{-15}$ L.

34. The apparatus of claim 26, wherein the heating device heats the droplets in a range of 100° to 400° C.

35. The apparatus of claim 26, wherein the first precursor reactant comprises a cadmium compound.

36. The apparatus of claim 26, wherein the first precursor reactant is selected from the group consisting of CdO, $Cd(NO_3)_2$, $CdCO_3$, Cd naphthenate, and $Cd(CH_3CO_2)_2$.

37. The apparatus of claim 26, wherein the second precursor reactant comprises a selenium compound.

38. The apparatus of claim 37, wherein the second precursor reactant is selected from the group consisting of phosphine chalcogenides or amine chalcogenides, including those selected from the group consisting of trioctylphosphine selenide, tributylphosphine selenide, triethylphosphine selenide, and selenium ethylenediamine complexes.

39. The apparatus of 37, wherein the second precursor reactant is selected from the group consisting of elemental selenium dissolved in trioctylphosphine and ethylenediamine.

40. The apparatus of claim 26, wherein the surfactant is selected from the group consisting of trioctylphosphine, trioctylphosphine oxide, stearic acid, hexadecylamine, oleic acid, and dodecylamine.

41. The apparatus of claim 26, wherein the high boiling point liquid selected from the group consisting of trioctylphosphine, trioctylphosphine with dioctylamine, trioctylphosphine oxide, trioctylphosphine oxide with dioctylamine, stearic acid, hexadecylamine, oleic acid, and dodecylamine.

42. The apparatus of claim 26, wherein the collecting device comprises a cold liquid, solid powder, or solid surface, or combination thereof.

43. The apparatus of claim 42, wherein the collecting device is a solvent-filled bubbler.

44. The apparatus of claim 26, wherein the first precursor reactant is selected from the group consisting of cadmium precursors and molybdenum precursors, and the second particle precursor reactant is a chalcogenide precursor.

45. The apparatus of claim 26 wherein the first precursor is selected from the group consisting of cadmium oxide, cadmium carbonate, cadmium naphthenate, and cadmium acetate and the second precursor is selected from the group consisting of elemental sulfur, selenium, tellurium dissolved in tributylphosphine or ethylenediamine and trioctylphosphine chalcogenide.

46. A method for producing nanometer-sized products comprising:
selecting a first precursor reactant and a second precursor reactant, the first and second precursor reactants capable of forming a compound,
mixing the first precursor reactant, the second precursor reactant, a surface-stabilizing surfactant, and a high boiling point liquid to form a mixture;
forming a mist of droplets of the mixture;
heating the droplets to cause a reaction between species of the first and second precursor reactants to form nanometer-sized products within the heated droplets; and
collecting the nanometer-sized products.

* * * * *